US012097906B2

(12) United States Patent
Ookubo

(10) Patent No.: US 12,097,906 B2
(45) Date of Patent: Sep. 24, 2024

(54) LONG COMPOSITE MEMBER

(71) Applicant: Nissan Motor Co., Ltd., Kanagawa (JP)

(72) Inventor: Hiroshi Ookubo, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 363 days.

(21) Appl. No.: 17/598,164

(22) PCT Filed: Mar. 26, 2019

(86) PCT No.: PCT/IB2019/000338
§ 371 (c)(1),
(2) Date: Sep. 24, 2021

(87) PCT Pub. No.: WO2020/194014
PCT Pub. Date: Oct. 1, 2020

(65) Prior Publication Data
US 2022/0169319 A1    Jun. 2, 2022

(51) Int. Cl.
*B62D 29/00* (2006.01)
*B62D 25/04* (2006.01)

(52) U.S. Cl.
CPC .......... *B62D 29/005* (2013.01); *B62D 25/04* (2013.01)

(58) Field of Classification Search
CPC .... B62D 29/005; B62D 25/04; B62D 29/004; B62D 29/002; B62D 29/001; B62D 25/06; B62D 25/025; B62D 21/157; B62D 27/023; B62D 21/15; B62D 25/2036

See application file for complete search history.

(56) References Cited

U.S. PATENT DOCUMENTS

| 5,277,462 A | 1/1994 | Verzelli et al. |
| 2018/0105129 A1 | 4/2018 | Hodoya et al. |

FOREIGN PATENT DOCUMENTS

| JP | H03-128740 A | 5/1991 |
| JP | 2004-314674 A | 11/2004 |
| JP | 2010-064504 A | 3/2010 |
| JP | 2013-212730 A | 10/2013 |
| JP | 2018-065452 A | 4/2018 |

OTHER PUBLICATIONS

Hirayama et al, JP2010064504A, English Translation, 2010, JPO, pp. 1-14 (Year: 2010).*

* cited by examiner

*Primary Examiner* — Maria V Ewald
*Assistant Examiner* — Ethan Weydemeyer
(74) *Attorney, Agent, or Firm* — Osha Bergman Watanabe & Burton LLP

(57) ABSTRACT

A long composite member (center pillar) includes a main member (pillar outer panel) that has a curvature in its longitudinal direction and whose shape of a cross-section perpendicular to the longitudinal direction protrudes on an outer side of the curvature, and a reinforcing member that is made of fiber reinforced plastic (CFRP) and is disposed on an inner side of the curvature with respect to the main member and within the cross-section of the main member. One end of the reinforcing member is adhered on a side of one end of the main member, and the other end of the reinforcing member is adhered on a side of the other end of the main member. An intermediary portion between the one end and the other end of the reinforcing member is extended straight within the cross-section of the main member.

6 Claims, 4 Drawing Sheets

LONG COMPOSITE MEMBER

TECHNICAL FIELD

The present invention relates to a long composite member made of metal and fiber reinforced plastic.

BACKGROUND ART

A vehicle frame structure, more specifically a center pillar structure of a vehicle is disclosed in a Patent Literature 1 listed below. This center pillar is configured by adjoining a reinforcing member made of fiber reinforced plastic (FRP) with an outer panel made of metal. That is, this center pillar is a long composite member made of metal and fiber reinforced plastic, and, by reinforcing a metal plate with reinforcing plastic, and satisfies both strength and stiffness as a structural frame member for a vehicle body to improve strength against an impact.

The long composite member (center pillar) curves convexly toward the outside of the vehicle body along its longitudinal direction. Therefore, the outer panel and the reinforcing member also curve similarly. A shape of a cross-section of the outer panel perpendicular to the longitudinal direction is a shape protruding on the outer side of the curvature and depressing on the inner side of the curvature (an angled U shape). The reinforcing member is adhered on the inner side (the curved inner surface) of the above cross-section of the outer panel. A shape of a cross-section of the reinforcing member perpendicular to the longitudinal direction is also a shape protruding on the outer side of the curvature and depressing on the inner side of the curvature (an angled U-shape).

CITATION LIST

Prior-art Literature

Patent Literature 1: Japanese Patent Application Publication No. 2013-212730

SUMMARY OF INVENTION

Problem to be Solved by the Invention

Upon a side impact to the vehicle body by another vehicle or upon a rollover of the vehicle due to the impact, the above long composite member (center pillar) receives a load from the outer side of the vehicle body, i.e. from the outer side of the curvature. When the load is large, it deforms toward the inside of the vehicle body such that the curvature collapses. The fiber reinforced plastic that forms the reinforcing member possesses characteristics of being strong against a tensile load but relatively weak against a compressive load. Therefore, the reinforcing member also deforms after the long composite member starts to deform, and thereby a compressive load also applies to the fiber reinforced plastic in addition to a tensile load. As the result, sufficient reinforcement cannot be got after the long composite member starts to deform.

Therefore, an object of the present invention is to provide a long composite member that can sufficiently counteract against a load after it starts to deform due to the load from the outer side of its curvature.

Means for Solving the Problem

A long composite member according to the present invention includes a main member that has a curvature in its longitudinal direction and a cross-sectional shape protruding on an outer side of the curvature, and a reinforcing member that is made of fiber reinforced plastic and is disposed on an inner side of the curvature with respect to the main member. One end of the reinforcing member is adhered on a side of one end of the main member, and the other end is adhered on a side of the other end of the main member. An intermediary portion of the reinforcing member is extended straight within the curvature of the main member.

DESCRIPTION OF EMBODIMENTS

Hereinafter, long composite members according to embodiments will be explained with reference to the drawings.

Figure 1:
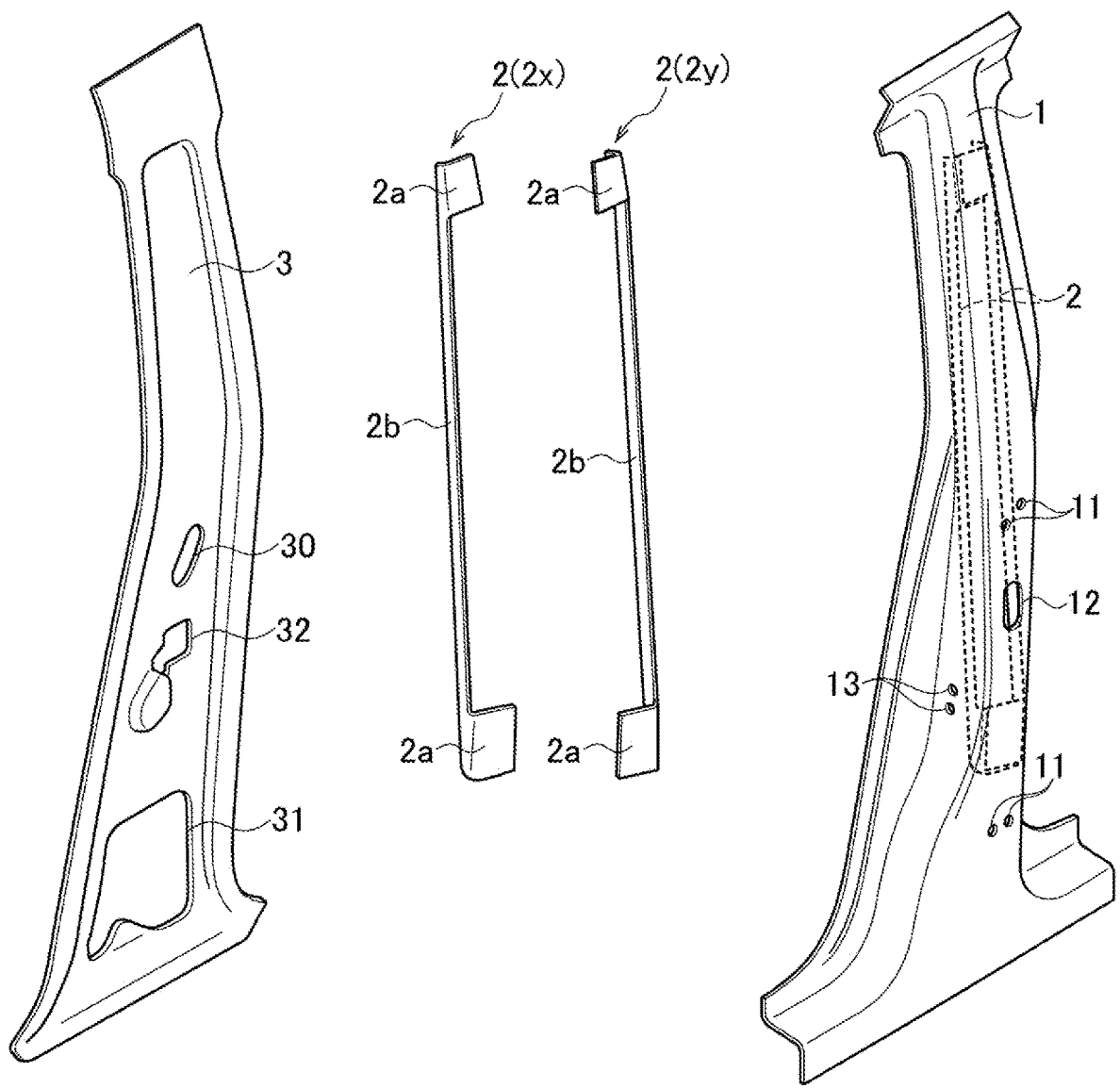
FIG. 1 is an exploded perspective view of a long composite member according to a first embodiment.
Figure 2:
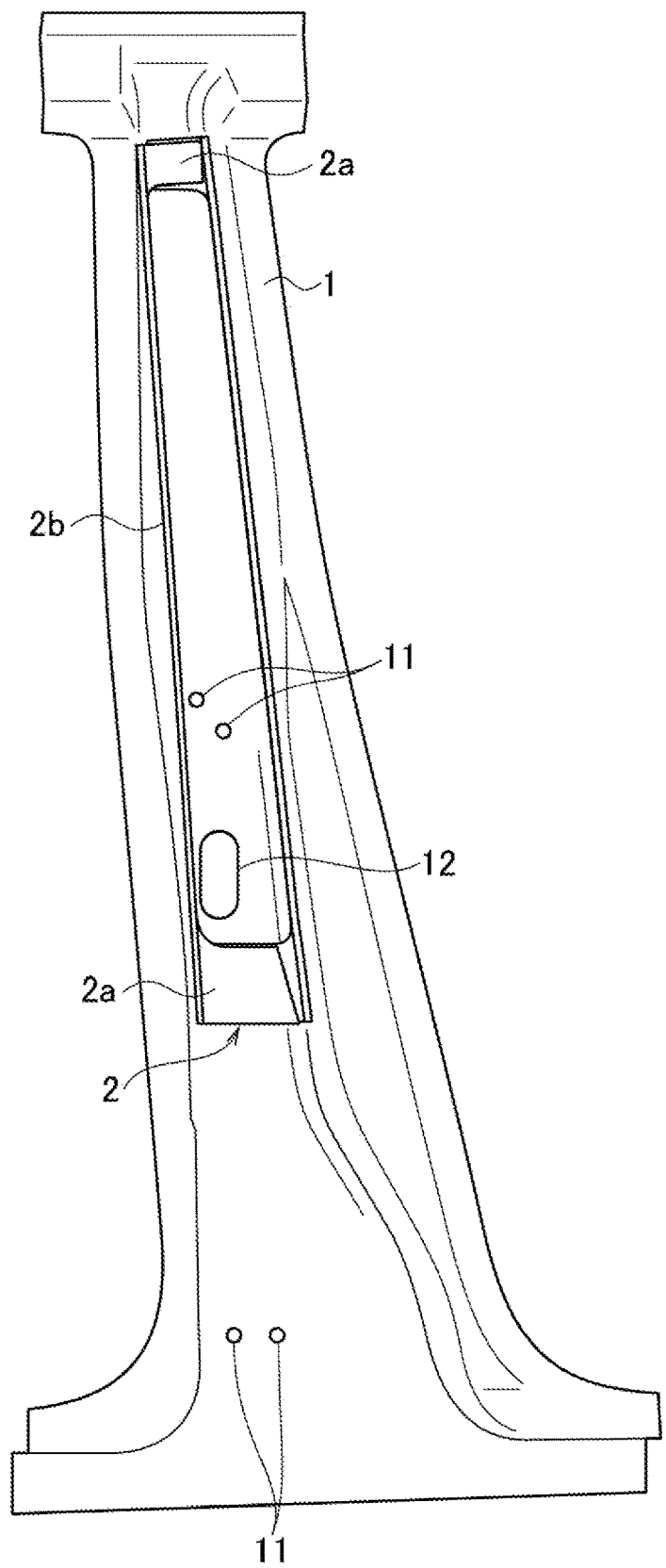
FIG. 2 is a back view of an inside of a second member of the long composite member.
Figure 3:
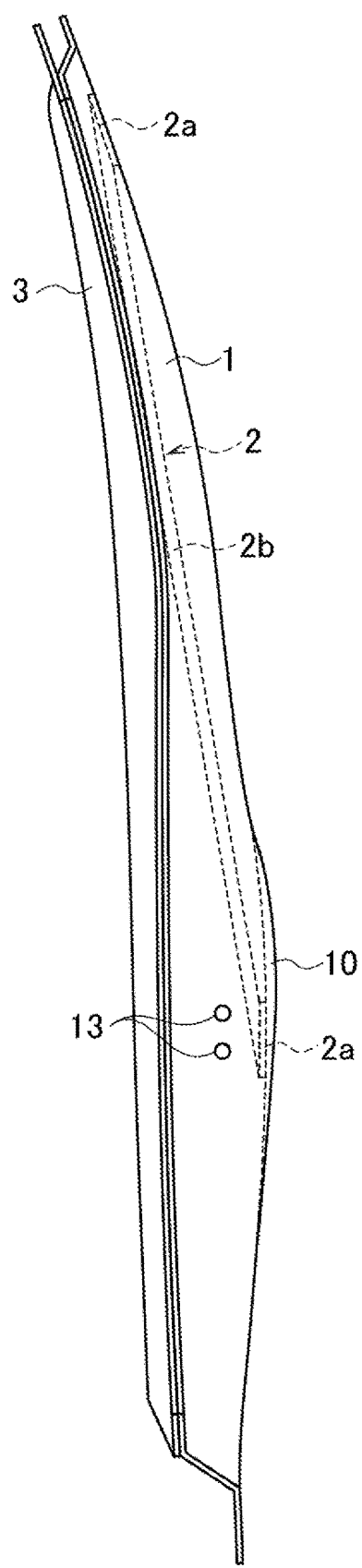
FIG. 3 is a side view of the long composite member.

As shown in FIG. 1 to FIG. 3, a long composite member according to a first embodiment is used as a structural frame member for a vehicle body, specifically as a center pillar (B-pillar). Note that there may be a case where a center pillar of a vehicle is formed as part of a body side panel integrally with a frame structure (a side sill, an A-pillar, a C-pillar, a roof side rail and so on) surrounding a front/rear door opening or with a rear fender. Also in such a case, its portion of a center pillar is a long composite member when seeing it independently.

The long composite member in the present embodiment is configured of a pillar outer panel 1 that serves as a main member and a pair of reinforcing members 2. In addition, as the center pillar, it also includes a pillar inner panel 3 that serves as a sub-member. The center pillar curves convexly toward the outer side of the vehicle body along its longitudinal direction. Therefore, the pillar outer panel 1 also curves convexly toward the outer side of the vehicle body along the longitudinal direction. The pillar inner panel 3 also slightly curves convexly toward the outer side of the vehicle body along the longitudinal direction.

A shape of a cross-section of the pillar outer panel 1 perpendicular to the longitudinal direction is a shape protruding on the outer side of the curvature. Hereinafter, this cross-sectional shape is referred as a prescribed cross-sectional shape. Further, the prescribed cross-sectional shape in the present embodiment is also regarded as being depressed from the inner side of the curvature, so that it is an angled U shape specifically. A shape of a cross-section of the pillar inner panel 3 perpendicular to the longitudinal direction is a shape depressed from the outer side of the curvature (but its depressing depth is sallow) and protruding on the inner side of the curvature, and is an angled U shape symmetrically with the angled U shape of the pillar outer panel 1.

The pillar outer panel 1 and the pillar inner panel 3 are formed by pressing a steel panel. Note that, in each of the pillar outer panel 1 and the pillar inner panel 3 mentioned above, flanges are extended outward from both side edges respectively to form a hat-shaped cross-section. The hat-shaped cross-section has a shape formed by extending the flanges from the angled U shape, and thereby it is a form of the prescribed cross-sectional shape and also a form of the angled U shape. The angled U shaped cross-section is formed by raising side panels from both side edges of a bottom plate (which can be regarded as a front panel), respectively. The paired side panels face to each other, and are substantially parallel to each other. Although a bead 10 is formed at a part of the bottom plate (front plate) of the pillar outer panel 1 in order to improve strength and stiffness, the cross-section of the pillar outer panel 1 has the angled U shape (the hat shape).

The pillar outer panel 1 and the pillar inner panel 3 are adjoined with each other by spot-welding at the above-mentioned flanges. Note that there may be a case where a portion of a body side panel that associates with the center pillar is disposed on an outer side of the pillar inner panel 3 (i.e. the pillar outer panel 1 is used as a pillar stiffener). In such a case, the body side panel is also adjoined integrally by spot-welding. The center pillar as the long composite member is configured by the pillar outer panel 1 and the pillar inner panel 3, and this center pillar (the long composite member) can resist a load from the outer side of the curvature effectively by attaching the pair of the reinforcing members 2 to its inside.

In the present embodiment, the pair of the reinforcing members 2 includes a first reinforcing member 2x and a second reinforcing member 2y (i.e. the plural reinforcing members 2x and 2y). The first reinforcing member 2x and the second reinforcing member 2y are formed symmetrically and used in a pair. Each of the reinforcing members 2 is made of fiber reinforced plastic, more specifically, CFRP (carbon fiber reinforced plastic) in which thermosetting resin is used as its matrix resin. The matrix resin in CFRP of the reinforcing members 2 is hardened before they are adhered on the pillar outer panel 1. In the present embodiment, each of the reinforcing members 2 is tape-shaped, and tabs 2a as adhered portions are formed at its both ends (one end and the other end), respectively. Each of the tabs 2a is extended laterally to be perpendicular to a longitudinal direction of the reinforcing member(s) 2. Each of the reinforcing members 2 is adhered, by adhesion, on the inner side of the pillar outer panel 1 at its both ends (including the tabs 2a).

More specifically, each one end (upper end) of the reinforcing members 2 is adhered on a side of one end (an upper-end side/an upper portion) of the pillar outer panel 1, and each other end (lower end) thereof is adhered on a side of the other end (a lower-end side/a lower portion) of the pillar outer panel 1. Its adhesion strength is adjusted by an adhesion area, i.e. an area of the tabs 2a. In the present embodiment, the tabs 2a of the first reinforcing member 2x are directly adhered on the pillar outer panel 1, and the tabs 2a of the second reinforcing member 2y are adhered on the pillar outer panel 1 with the tabs 2a of the first reinforcing member 2x interposed therebetween. A portion between the both ends of each of the reinforcing members 2 is formed as an intermediary portion 2b that extends straight tridimensionally. Directionality of the fibers in CFRP of the intermediary portion 2b is made coincident with the extending direction of the intermediary portion 2b.

Note that there may be a case where only a single reinforcing member 2 is provided, but it requires a width equal to a sum of widths of the first reinforcing member 2x and the second reinforcing member 2y mentioned above in such a case. In addition, in the case where only a single reinforcing member 2 is provided, its both ends are adhered on an inner surface of the above-mentioned bottom plate (front plate) of the pillar outer panel 1 (the tabs 2a are not needed). However, in the present embodiment, the long composite member is used as the center pillar of the vehicle body, and attachment holes 11 for hinges of a rear door are formed on the pillar outer panel 1. Since the hinges for the rear door are fastened by nuts from a side of a passenger compartment, the nuts cannot be fastened if the single reinforcing member 2 is adhered on the inner surface of the bottom plate (front plate) of the pillar outer panel 1. The above-mentioned single reinforcing member 2 may be adhered only on one of the side panels if there are no complications in a space constraint, but it is difficult in the present embodiment as shown in FIG. 3.

In addition, a through hole 12 for routing a harness to the rear door is also formed on the pillar outer panel 1. One end of a grommet for protecting the harness and preventing rain waters from infiltrating into the center pillar is attached to the through hole 12 (the other end of the grommet is attached to the rear door). Therefore, if the single reinforcing member 2 is adhered on the inner surface of the bottom plate (front plate) of the pillar outer panel 1, the harness cannot be routed through the through hole 12. So, by providing the first reinforcing member 2x and the second reinforcing member 2y separately in the present embodiment, arrangement flexibility can be improved. Specifically, by orienting the reinforcing members 2 such that planes of the intermediary portions 2b is made almost parallel to planes of the side plates of the pillar outer panel 1, an internal space of the center pillar can be utilized effectively.

Note that an opening 30 is also formed on the pillar inner panel 3 in order to fasten the above-mentioned nuts to the hinges of the rear door. In addition, attachment holes 13 for a door lock striker of a front door and attachment holes (not shown in the drawings) for a check link that regulates a maximum open angle of the rear door are also formed on the side panels of the pillar outer panel 1. Weld nuts are welded on the inner side of the pillar outer panel 1 at the attachment holes 13 for the door lock striker and the attachment holes for the check link. Therefore, the reinforcing members 2 are arranged so as to avoid contacts with these weld nuts. Thus, the improved arrangement flexibility is beneficial.

Note that a seatbelt unit for a front seat is housed inside a lower end of the center pillar. Therefore, an opening 31 is formed at the lower end of the pillar inner panel 3. A portion of the seatbelt for lumbar is led out through the opening 31. In addition, an opening 32 through which the other portion of the seatbelt for shoulder is led out is also formed on the pillar inner panel 3. Although not shown in the drawings, a mechanism for supporting a seatbelt anchor is also provided at an upper portion of the center pillar (long composite member). The improved arrangement flexibility is beneficial also in consideration of these unit and mechanism.

As explained above, the both ends of the reinforcing member(s) 2 are adhered on the inner side of the above-mentioned prescribed cross-sectional shape of the curved pillar outer panel 1 in the present embodiment. And, the intermediary portion 2b of the reinforcing member(s) 2 is extended straight on the inner side of the pillar outer panel 1. In other words, the intermediary portion 2b is provided like a cord of a bow. Therefore, upon a side impact to the vehicle body by another vehicle or upon a rollover of the vehicle due to the impact, a load is applied to the center pillar (long composite member) from the outer side of the curvature. The load from the outer side of the curvature acts on the outer pillar panel 1 so as to expand the curvature. Although a tensile load acts on the intermediary portions 2b of the reinforcing members 2 in the consequence, the intermediary portions 2b made of CFRP can resist against the tensile load to restrict the deformation of the center pillar (long composite member). Since the directionality of the fibers in CFRP of the intermediary portion(s) $2b$ is made coincident with the extending direction of the intermediary portion $2b$, it can resist against the tensile load more effectively. Since the long composite member is the center pillar in the present embodiment, a space of the passenger compartment can be sustained.

The fiber reinforced plastic (CFRP) that forms the reinforcing members 2 is strong against a tensile load, but relatively weak against a compressive load. Since only the tensile load acts on the intermediary portions $2b$ but no compressive load acts thereon in the present embodiment, they can resist the tensile load stably. When the above-mentioned load from the outer side of the curvature is large, there may be a case where the center pillar starts deforming to the inner side of the curvature. Also in such a case, the reinforcing members 2 are attached to the curved pillar outer panel 1 like a cord of a bow, and thereby a clearance is formed between the pillar outer panel 1 and the reinforcing members 2. Therefore, only the tensile load acts on the reinforcing members 2 until the pillar outer panel 1 would deform and then contact with the reinforcing members 2. Thus, it is possible to restrict the deformation of the center pillar (long composite member) effectively until the pillar outer panel 1 is largely deformed.

Figure 4:
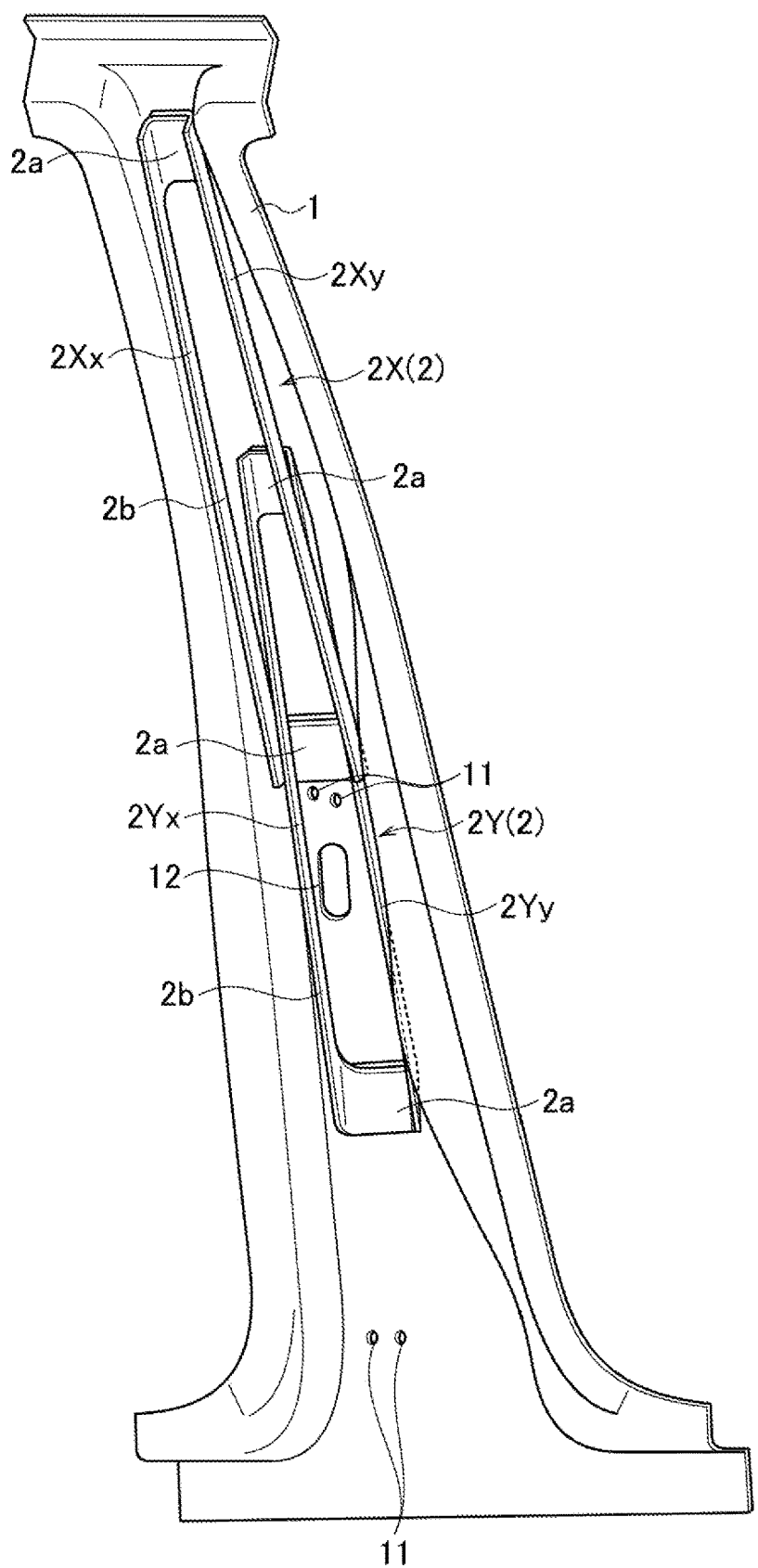
FIG. 4 is a perspective view of a long composite member according to a second embodiment.

Next, a second embodiment will be explained with reference to FIG. 4. Configurational elements identical or equivalent to those in the above-explained in the first embodiment are labeled with identical signs and their detailed explanations will be omitted. In the center pillar of the present embodiment, two pairs of the reinforcing members 2 of the first embodiment are provided such that the pairs are crossed in a side view. In the first embodiment, the paired reinforcing member 2 are denoted as the first reinforcing member $2x$ and the second reinforcing member $2y$. They may be denoted in the same manner also in the present embodiment, but explanations will be made by denoting one of the two pairs of the reinforcing members 2 as first reinforcing members 2X and denoting the other pair as second reinforcing members 2Y.

The first reinforcing members 2X are disposed at an upper portion of the pillar outer panel (main member) 1, and the second reinforcing members 2Y are disposed at a lower portion of the pillar outer panel 1. The first reinforcing members 2X comprises a pair of first reinforcing members 2Xx and 2Xy that are almost parallel to each other. Each of the first reinforcing members 2Xx and 2Xy is tape-shaped, and the tabs $2a$ as adhered portions are extended from its both ends (one end and the other end), respectively. Each of the first reinforcing members 2Xx and 2Xy is adhered, by adhesion, on the inner side of the pillar outer panel 1 at its both ends (including the tabs $2a$). In the present embodiment, the tabs $2a$ of the first reinforcing member 2Xx are directly adhered on the pillar outer panel 1, and the tabs $2a$ of the first reinforcing member 2Xy are adhered on the pillar outer panel 1 with the tabs $2a$ of the first reinforcing member 2Xx interposed therebetween. With respect to each of the first reinforcing members 2Xx and 2Xy, a portion between its both ends is formed as the intermediary portion $2b$ that extends straight tridimensionally. Directionality of the fibers in CFRP of the intermediary portion $2b$ is made coincident with the extending direction of the intermediary portion $2b$.

Similarly, the second reinforcing members 2Y comprises a pair of second reinforcing members 2Yx and 2Yy that are almost parallel to each other. Each of the second reinforcing members 2Yx and 2Yy is also tape-shaped, and the tabs $2a$ are also extended from its both ends, respectively. Each of the second reinforcing members 2Xx and 2Xy is adhered, by adhesion, on the inner side of the pillar outer panel 1 at its both ends (including the tabs $2a$). The tabs $2a$ of the second reinforcing member 2Yx are directly adhered on the pillar outer panel 1, and the tabs $2a$ of the second reinforcing member 2Yy are adhered on the pillar outer panel 1 with the tabs $2a$ of the second reinforcing member 2Yx interposed therebetween. With respect to each of the second reinforcing members 2Yx and 2Yy, a portion between its both ends is formed as the intermediary portion $2b$ that extends straight tridimensionally. Directionality of the fibers in CFRP of the intermediary portion $2b$ is made coincident with the extending direction of the intermediary portion $2b$. The intermediary portions $2b$ of the first reinforcing members 2X and the intermediary portions $2b$ of the second reinforcing members 2Y are crossed with each other.

The first reinforcing members 2X and the second reinforcing members 2Y in the present invention can be regarded as being formed by dividing the reinforcing members 2 of the first embodiment. In the present embodiment, an area where the reinforcing members 2 are disposed is expanded downward by dividing them (see FIG. 2 and FIG. 4). By the first reinforcing members 2X and the second reinforcing members 2Y in the divided manner, it becomes possible to arrange the reinforcing members 2 along the curved shape of the pillar outer panel 1, and thereby the pillar outer panel 1 can be prevented from contacting with the pillar inner panel 3 facing thereto. In other words, the arrangement flexibility of the reinforcing members 2 can be improved. Since the arrangement flexibility of the reinforcing members 2 can be improved, contacts with the above-mentioned weld nuts and so on can be prevented.

Especially in the present embodiment, the extending direction of the intermediary portions $2b$ of the first reinforcing members 2X and the extending direction of the intermediary portions $2b$ of the second reinforcing members 2Y are crossed with each other. In other words, the first reinforcing members 2X and the second reinforcing members 2Y are disposed so as to be overlapped along the curved direction of the pillar outer panel 1. By arranging them in this manner, the tensile force for restricting the deformation of the pillar outer panel 1 can be generated in plural directions when a load from the outer side of the curvature acts on the center pillar (long composite member), and positions of them can be also adjusted. As the result, it becomes possible to resist against the load from the outer side of the curvature more effectively.

In addition, there may be a case where au upper end of the pillar outer panel 1 deforms inward upon a collision or a rollover in the first embodiment, for example. In such a case, the intermediary portions $2b$ of the reinforcing members 2 may be bent, and thereby it may become impossible to resist against the load from the outer side of the curvature (no tensile load acts on the intermediary portions $2b$). According to the present embodiment, when the pillar outer panel 1 deforms in the same manner, the intermediary portions $2b$ of the upper first reinforcing members 2X may be bent similarly to the first embodiment, and they probably can't resist against the load from the outer side of the curvature. However, the intermediary portions $2b$ of the lower second reinforcing members 2Y are not bent, and thereby they can resist against the load from the outer side of the curvature.

The long composite member in the first embodiment and the second embodiment explained above is used as a structural frame member of a vehicle body (a center pillar), and is used such that it curves convexly toward the outer side of the vehicle body. A load acts on the structural frame member of the vehicle body from the outer side of the curvature upon a side impact or a rollover as mentioned above, and thereby a tensile load acts on the reinforcing members 2. The reinforcing members 2 are made of fiber reinforced plastic (CFRP in the present embodiments), so that it is strong against a tensile load rather than a compressive load. In addition, although a compressive load also acts on the main member 1 (and the sub-member 3) due to the above-mentioned load, the main member 1 (and the sub-member 3) made of metal is strong against the compressive load. Therefore, the long composite member of the above embodiments is preferably used as a structural frame member of a vehicle body, because it can resist effectively against a load that acts thereon upon a side impact or a rollover. For example, the long composite member of the above embodiments can be preferably used as an A pillar, a C pillar, a roof side rail, a front bumper and a rear bumper in addition to the center pillar (B-pillar) (such that the main member 1 is curved convexly toward the outside of the vehicle body). Especially, by using the long composite member in an outer shell structure (the A to C pillars and the roof side rails), a space of the passenger compartment (a survival space) can be sustained even when a load acts on the vehicle body from the outside.

Note that the present invention is not limited to the embodiments explained above. For example, the reinforcing members 2 in the above embodiments are made of CFRP, but may be made of other fiber reinforced plastic such as CFRTP and GFRP.

INDUSTRIAL APPLICABILITY

The long composite member (and the method for making it) according to the present invention can be used as a structural frame member for a vehicle body.

REFERENCE SIGNS LIST

1 pillar outer panel (main member)
2 reinforcing member
2x, 2X first reinforcing member
2y, 2Y second reinforcing member
2a tab (one end and the other end of the reinforcing member)
2b intermediary portion (of the reinforcing member)
3 pillar inner panel (sub-member)

The invention claimed is:

1. A long composite member comprising:
a main member that has a curvature in a longitudinal direction thereof and a shape of whose cross-section perpendicular to the longitudinal direction is a shape protruding on an outer side of the curvature, wherein the longitudinal direction is longer than the direction perpendicular to the longitudinal direction, and
a reinforcing member that is made of fiber reinforced plastic and is disposed on an inner side of the curvature with respect to the main member and within the cross-section,
wherein one end of the reinforcing member is adhered on a side of one end of the main member along the longitudinal direction, and another end of the reinforcing member is adhered on a side of another end of the main member along the longitudinal direction, wherein the one end is opposite the another end along the longitudinal direction,
an intermediary portion of the reinforcing member between the one end and the other end is extended straight within the cross-section of the main member, and
a clearance is formed between the main member and the intermediary portion of the reinforcing member such that there is no adhesion therebetween.

2. The long composite member according to claim 1, wherein
the reinforcing member comprises at least a first reinforcing member and a second reinforcing member.

3. The long composite member according to claim 2, wherein
an extending direction of an intermediary portion of the first reinforcing member and an extending direction of an intermediary portion of the second reinforcing member are crossed in the longitudinal direction.

4. The long composite member according to claim 1, wherein
directionality of fibers in the fiber reinforced plastic of the intermediary portion is made coincident with an extending direction of the intermediary portion.

5. The long composite member according to claim 2, wherein
directionality of fibers in the fiber reinforced plastic of the intermediary portion is made coincident with an extending direction of the intermediary portion.

6. The long composite member according to claim 3, wherein
directionality of fibers in the fiber reinforced plastic of the intermediary portion is made coincident with an extending direction of the intermediary portion.

* * * * *